(12) United States Patent
Zhu et al.

(10) Patent No.: US 11,026,129 B2
(45) Date of Patent: Jun. 1, 2021

(54) SYSTEM AND METHOD FOR RETURNING TO 5G AFTER FALLBACK

(71) Applicant: Verizon Patent and Licensing Inc., Arlington, VA (US)

(72) Inventors: Lily Zhu, Parsippany, NJ (US); Xin Wang, Morris Plains, NJ (US); Andrew E. Youtz, Princeton, NJ (US); Hui Zhao, Marlboro, NJ (US); Deepa Jagannatha, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/428,384

(22) Filed: May 31, 2019

(65) Prior Publication Data

US 2020/0383010 A1 Dec. 3, 2020

(51) Int. Cl.
| | |
|---|---|
| *H04W 36/00* | (2009.01) |
| *H04W 24/10* | (2009.01) |
| *H04W 36/14* | (2009.01) |
| *H04W 76/15* | (2018.01) |
| *H04W 76/27* | (2018.01) |
| *H04W 8/08* | (2009.01) |
| *H04W 8/24* | (2009.01) |

(52) U.S. Cl.
CPC ......... *H04W 36/0022* (2013.01); *H04W 8/08* (2013.01); *H04W 8/24* (2013.01); *H04W 24/10* (2013.01); *H04W 36/14* (2013.01); *H04W 76/15* (2018.02); *H04W 76/27* (2018.02)

(58) Field of Classification Search
None
See application file for complete search history.

(56) References Cited

U.S. PATENT DOCUMENTS

| | | | |
|---|---|---|---|
| 2011/0014919 A1* | 1/2011 | Otte | H04W 36/0061 455/442 |
| 2016/0212706 A1* | 7/2016 | Kahtava | H04W 36/30 |
| 2018/0132141 A1* | 5/2018 | Huang-Fu | H04L 65/1063 |
| 2018/0368016 A1* | 12/2018 | Lee | H04B 17/318 |
| 2019/0239271 A1* | 8/2019 | Guerzoni | H04W 76/16 |
| 2019/0364470 A1* | 11/2019 | Chen | H04W 36/14 |
| 2020/0015128 A1* | 1/2020 | Stojanovski | H04W 8/08 |

* cited by examiner

*Primary Examiner* — Anh Ngoc M Nguyen

(57) ABSTRACT

Systems and methods described herein bring a 5G standalone-capable end device back into 5G service to leverage the 5G network's data capacity as soon as a VoLTE call is over. A network device receives a fallback connection, for a 5G New Radio (NR) standalone-capable end device, from a second network to the first network to support a voice call on the end device, wherein the fallback connection supports a voice-over-LTE call. The network device detects an end of the VoLTE call and initiates, in response to the detecting, a handover of the end device back to the second network, wherein the initiating occurs while the end device is in a radio resource control (RRC) connected mode.

20 Claims, 9 Drawing Sheets

SYSTEM AND METHOD FOR RETURNING TO 5G AFTER FALLBACK

BACKGROUND

Long Term Evolution (LTE) is a mobile telecommunications standard for wireless communications involving mobile user equipment, such as mobile devices and data terminals. LTE networks include existing Fourth Generation (4G) and 4.5 Generation (4.5G) wireless networks. Next Generation mobile networks, such as Fifth Generation (5G) mobile networks, are being implemented as the next evolution of mobile wireless networks. 5G mobile networks are designed to increase data transfer rates, increase spectral efficiency, improve coverage, increase capacity, and reduce latency. 5G networks may use different frequencies, different radio access technologies, and different core network functions than current or legacy wireless networks (e.g., 4G networks).

While 5G networks are being deployed and evolving, 5G-capable end devices need to be supported in legacy networks, such as LTE networks. For example, the end devices may switch between different frequency bands, core networks, and radio access networks (RANs) that support either 4G or 5G standards. In a mobility context, mobile network operators need to support continuity of voice and data connections during network changes to provide a good user experience for customers while maximizing the benefits of 5G connections.

DETAILED DESCRIPTION OF THE PREFERRED EMBODIMENTS

Figure 1:
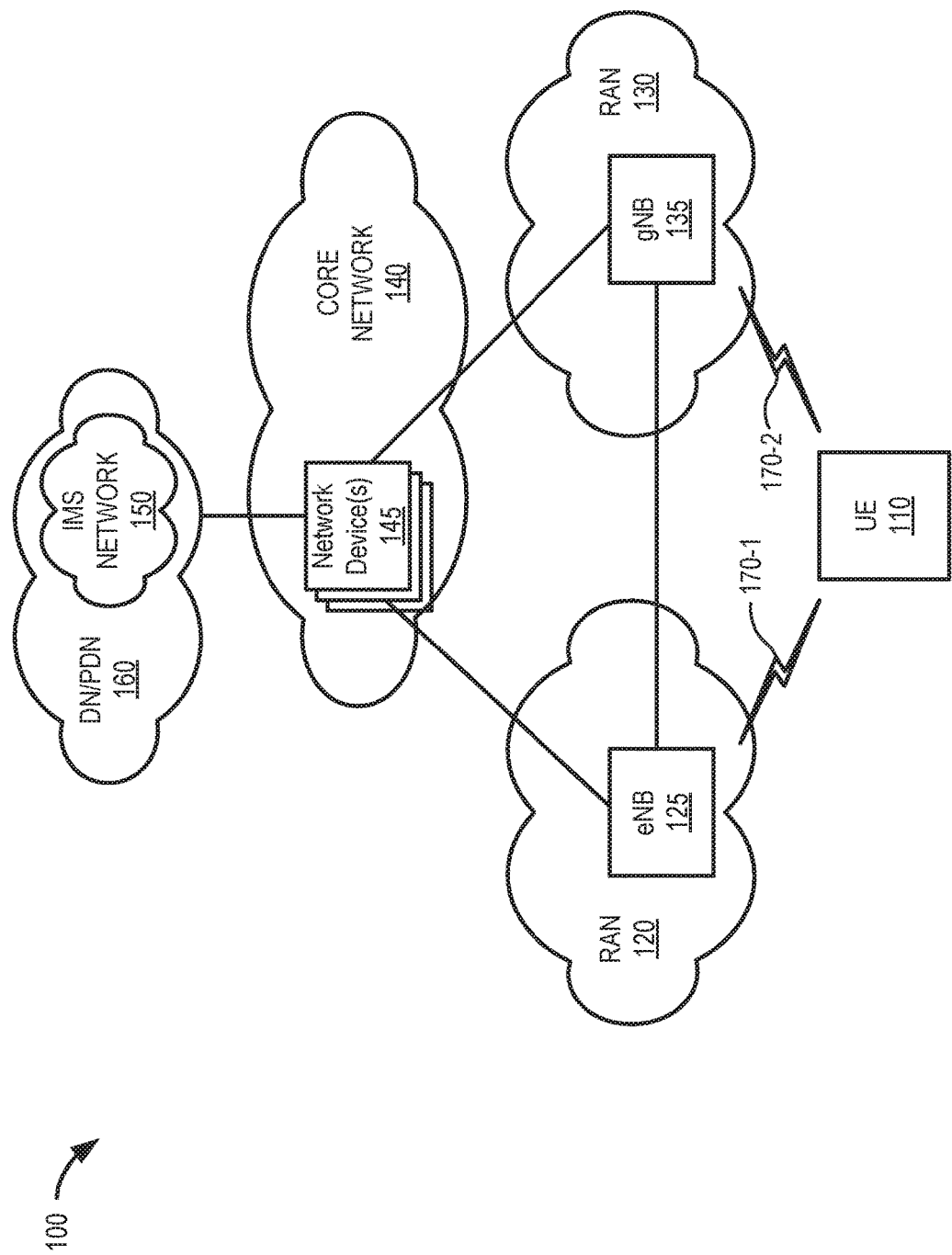
FIG. 1 illustrates an exemplary network environment in which systems and methods described herein may be implemented.

The following detailed description refers to the accompanying drawings. The same reference numbers in different drawings may identify the same or similar elements. Also, the following detailed description does not limit the invention.

As Fifth Generation (5G) networks are being rolled out, user equipment (referred to a "UE" or an "end device") is being configured to connect to both 5G radio access networks (also referred to as New Radio (NR) radio access networks (RANs)) and 4G RANs, such as an Evolved UMTS Terrestrial Radio Access Network (E-UTRAN) of a Long Term Evolution (LTE) network. 5G end devices may need to be supported in 4G networks because of coverage reasons (e.g., limited coverage areas of 5G RANs) and/or feature support (e.g., features, such as voice-over-LTE, that rely on 4G in initial 5G deployments when voice-over-NR (VoNR) is not ready).

5G-capable end devices that do not need to rely on 4G wireless stations to establish 5G connectivity (also referred to as "NR standalone-capable end devices") may switch between different frequency bands, core networks, and RANs that support either 4G or 5G standards. In a mobility context, a mobile network needs to support continuity of voice and data connections, to provide a good user experience for customers while maximizing the benefits of 5G connections. However, switching between the different frequency bands, core networks, and/or RANs can cause service interruptions when an end device changes network connections mid-session. In some use cases, these service interruptions may not affect the user experience. However, continuity of voice calls presents a particular challenge in a 4G/5G mobility context, since voice services typically have the most stringent requirements in terms of latency and user experience.

Thus, until voice-over-new-radio (VoNR) is supported fully (e.g., with equivalent coverage and capacity currently achieved by 4G networks for voice-over-LTE (VoLTE)), default fallback to 4G networks is necessary for voice calls by 5G-capable end devices. For example, in NR coverage area that does not support Voice (VoNR), when a voice call starts, the end device is redirected or performs an inter-RAT handover from NR to LTE when a dedicated bearer required for the voice call is set up. From then on, VoLTE will be used and the end device is served by the LTE network. However, after completion of a VoLTE call it is preferable to bring the end device back into the 5G service (e.g., to leverage the 5G network's data capacity) as soon as possible.

Currently, after a VoLTE call is over, there is no clearly-defined mechanism to make the end device return to the 5G network when data traffic continues after the VoLTE call (e.g., the end device is still in radio resource control (RRC) connected mode due to data activities). The end device is not prompted to perform higher priority network selection until the end device transitions to an RRC idle mode. In order to leverage 5G networks and provide the best user experience on data throughput and other potential services, service providers need a mechanism to trigger end devices to more quickly return to 5G networks after a VoLTE fallback.

Systems and methods described herein bring a 5G standalone-capable end device back into 5G service to leverage the 5G network's data capacity as soon as a VoLTE call is over. According to an implementation, a network device, such as a base station for a 4G network, receives a fallback connection, for a 5G New Radio (NR) standalone-capable end device, from a second network (e.g., a 5G network) to a first network (e.g., a 4G network) to support a voice call on the end device, wherein the fallback connection supports a voice-over-LTE call. The network device detects an end of the VoLTE call and initiates, in response to the detecting, a handover of the end device back to the second network, wherein the initiating occurs while the end device is in a radio resource control (RRC) connected mode.

FIG. 1 is a diagram of an exemplary network environment 100 in which the systems and methods described herein may be implemented. Referring to FIG. 1, environment 100 includes user equipment (UE) 110, a RAN 120 with a wireless station 125, a RAN 140 with a wireless station 135, a core network 140 with network devices 145, an IP Multimedia Subsystem (IMS) network 150, and data network (DN)/packet data network (PDN) 160. In other embodiments, environment 100 may include additional networks, fewer networks, and/or different types of networks than those illustrated and described herein.

Network environment 100 includes links between the networks and between the devices. For example, environment 100 may include wired, optical, and/or wireless links among the devices and the networks illustrated. A communication connection via a link may be direct or indirect. For example, an indirect communication connection may involve an intermediary device and/or an intermediary network not illustrated in FIG. 1. Additionally, the number and the arrangement of links illustrated in environment 100 are exemplary.

In the configuration illustrated in FIG. 1, UE 110 may use wireless channels 170-1 and 170-2 (referred to collectively as wireless channels 170) to access wireless stations 125 and 135, respectively. Wireless channels 170 may correspond, for example, to a physical layer in accordance with different radio access technology (RAT) types. For example, wireless channel 170-1 may correspond to the physical layer associated with 4G or 4.5G RAN standards (e.g., 3GPP standards for 4G and 4.5G air interfaces, collectively referred to herein as "4G"), while wireless channel 170-2 may correspond to the physical layer associated with 5G New Radio standards (e.g., 3GPP standards for 5G air interfaces).

UE 110 (also referred to herein as UE device 110 or user device 110), may include any type of mobile device having multiple coverage mode capabilities (e.g., E-UTRA-NR Dual Connectivity (EN-DC) capabilities) and is able to communicate with different wireless stations (e.g., wireless stations 125 and 135) using different wireless channels (e.g., channels 170) corresponding to different RANs (e.g., RANs 120 and 130). UE 110 may be a mobile device that may include, for example, a cellular radiotelephone, a smart phone, a tablet, any type of internet protocol (IP) communications device, a Voice over Internet Protocol (VoIP) device, a personal computer (PC), a laptop computer, a wearable computer (e.g., a wrist watch, eye glasses, etc.), a gaming device, a media playing device, etc. In other implementation, UE 110 may be implemented as a machine-type communications (MTC) device, an Internet of Things (IoT) device, a machine-to-machine (M2M) device, etc.

According to implementations described herein, UE 110 may be provisioned (e.g., via a subscriber identity module (SIM) card or another secure element) to recognize particular network identifiers (e.g., associated with RANs 120 and 130) and to support particular radio frequency (RF) spectrum ranges.

RAN 120 and RAN 130 may have different RAT types. RAN 120 may include a radio access network for a 4G or advanced 4G network. For example, in one implementation, RAN 120 may include an E-UTRAN for an LTE network. RAN 130 may include a 5G NR RAN or both a 5G NR RAN and an E-UTRAN for an LTE network. For example, RAN 130 may be configured to support communications via both LTE and 5G networks.

Wireless stations 125 and 135 may each include a network device that has computational and wireless communication capabilities. Wireless station 125 may include a transceiver system that connects UE device 110 to other components of RAN 120 and core network 140 using wireless/wired interfaces. In the configuration of FIG. 1, wireless station 125 may be implemented as a base station (BS), an evolved Node B (eNB), an evolved LTE (eLTE) eNB, or another type of wireless node (e.g., a picocell node, a femtocell node, a microcell node, etc.) that provides wireless access to one of RANs 120. Wireless station 135 may include a transceiver system that connects UE device 110 to other components of RAN 130 and core network 140 using wireless/wired interfaces. For example, wireless station 135 may include a next generation NodeB (gNB) or a combination eNB and gNB.

Core network 140 may include one or multiple networks of one or multiple types. For example, core network 140 may be implemented to include a terrestrial network and/or a satellite network. According to an exemplary implementation, core network 140 includes a network pertaining to multiple RANs 130. For example, core network 140 may include the core part of an LTE network, an LTE-Advanced network, a 5G network, a legacy network, etc.

Depending on the implementation, core network 140 may include various network elements that may be implemented in network devices 145. Such network elements may include a mobility management entity (MME), a user plane function (UPF), a session management function (SMF), a core access and mobility management function (AMF), a unified data management (UDM), a PDN gateway (PGW), a serving gateway (SGW), a policy control function (PCF), a home subscriber server (HSS), as well other network elements pertaining to various network-related functions, such as billing, security, authentication and authorization, network polices, subscriber profiles, network slicing, and/or other network elements that facilitate the operation of core network 140.

DN/PDN 160 may include one or more IP networks. The IP layer may be implemented over a local area network (LAN), a wide area network (WAN), a metropolitan area network (MAN), a telephone network, etc., capable of communicating with UE 110. In one implementation, DN/PDN 160 includes a network that provides data services (e.g., via packets or any other Internet protocol (IP) datagrams) to user device 110. Some or all of a particular DN/PDN 160 may be managed by a communication services provider that also manages RAN 120, RAN 130, core network 140, and/or particular UE devices 110. In some implementations, DN/PDN 160 may include IMS network 150. IMS network 150 may include a network for delivering IP multimedia services and may provide media flows between two different UEs 110, and/or between a particular UE 110 and external IP networks or external circuit-switched networks (not shown in FIG. 1).

The number and arrangement of devices in network environment 100 are exemplary. According to other embodiments, network environment 100 may include additional devices (e.g., thousands of UE 110s, hundreds of wireless stations 125/135, dozens of RANs 120/130, etc.) and/or differently arranged devices, than those illustrated in FIG. 1.

As described above, in an exemplary implementation, UE 110 is an EN-DC device capable of communicating via a 4G network (e.g., an LTE network) or 4.5G network, as well as via a 5G network. In conventional systems based on current standards, when UE 110 may connect to a cell based on the signal strengths of the particular wireless stations, with preference given to wireless stations that provide 5G service.

Figure 2:
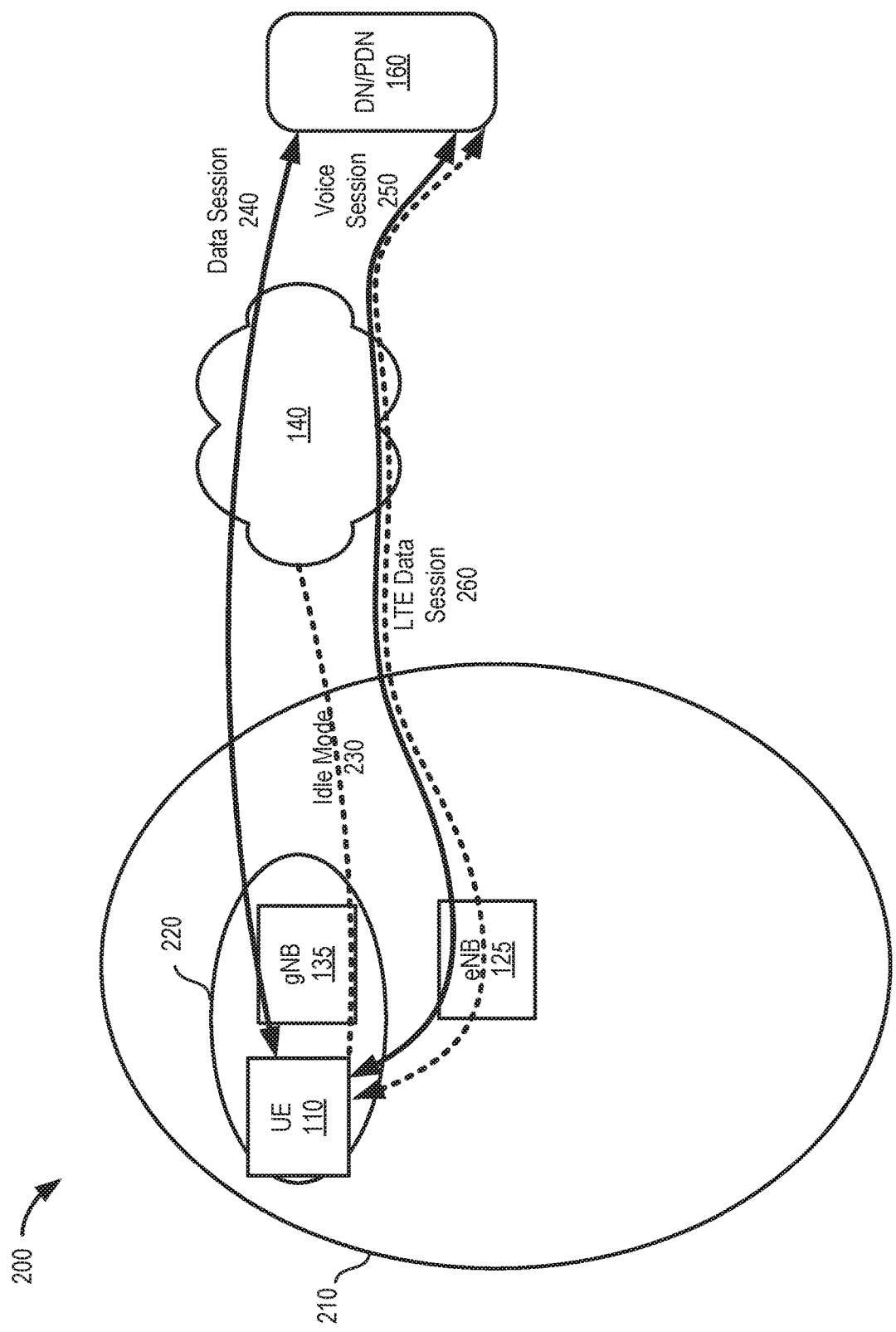
FIG. 2 is a diagram illustrating exemplary communications for an end device within a dual coverage area in a portion of the network environment of FIG. 1.

FIG. 2 is a diagram illustrating exemplary connections for UE 110 in a portion 200 of network environment 100. FIG. 2 generally shows connections between UE 110 and DN/PDN 160, which may be an intermediate point or endpoint for a voice/data session with UE 110. Particularly, FIG. 2 illustrates connections when UE 110 is within a 5G cell or coverage area 220 (e.g., serviced by gNB 135) that is also within a larger 4G cell or coverage area 210 (e.g., serviced by eNB 125).

According to implementations described herein, when UE 110 is in the RRC idle mode and located within the coverage area of a 5G cell, UE 110 may camp on the 5G cell (e.g., 5G cell 220), as indicated by reference 230. For voice sessions (e.g., voice session 250), UE 110 may use eNB 125 for 4G cell 210 to ensure uninterrupted VoLTE mobility. For data sessions (e.g., data session 240), gNB 125 may be used with 5G cell 220 to provide the highest connection speeds.

As described further herein, when UE 110 uses VoLTE (voice session 250) for a voice call via eNB 125, data (e.g., data session 260) also is routed through eNB 125. If a data session continues past the end of a VoLTE call, unless prompted otherwise, the network will not handover UE 110 to gNB 135 until an RCC idle state occurs. According to implementations described herein, eNB 125 may detect the end of the VoLTE call (e.g., voice session 250) and/or a continuation of data session 260 after the VoLTE call, and initiate a handover of UE 110 to gNB 135, eliminating the handover delay after the VoLTE fallback.

Figure 3:
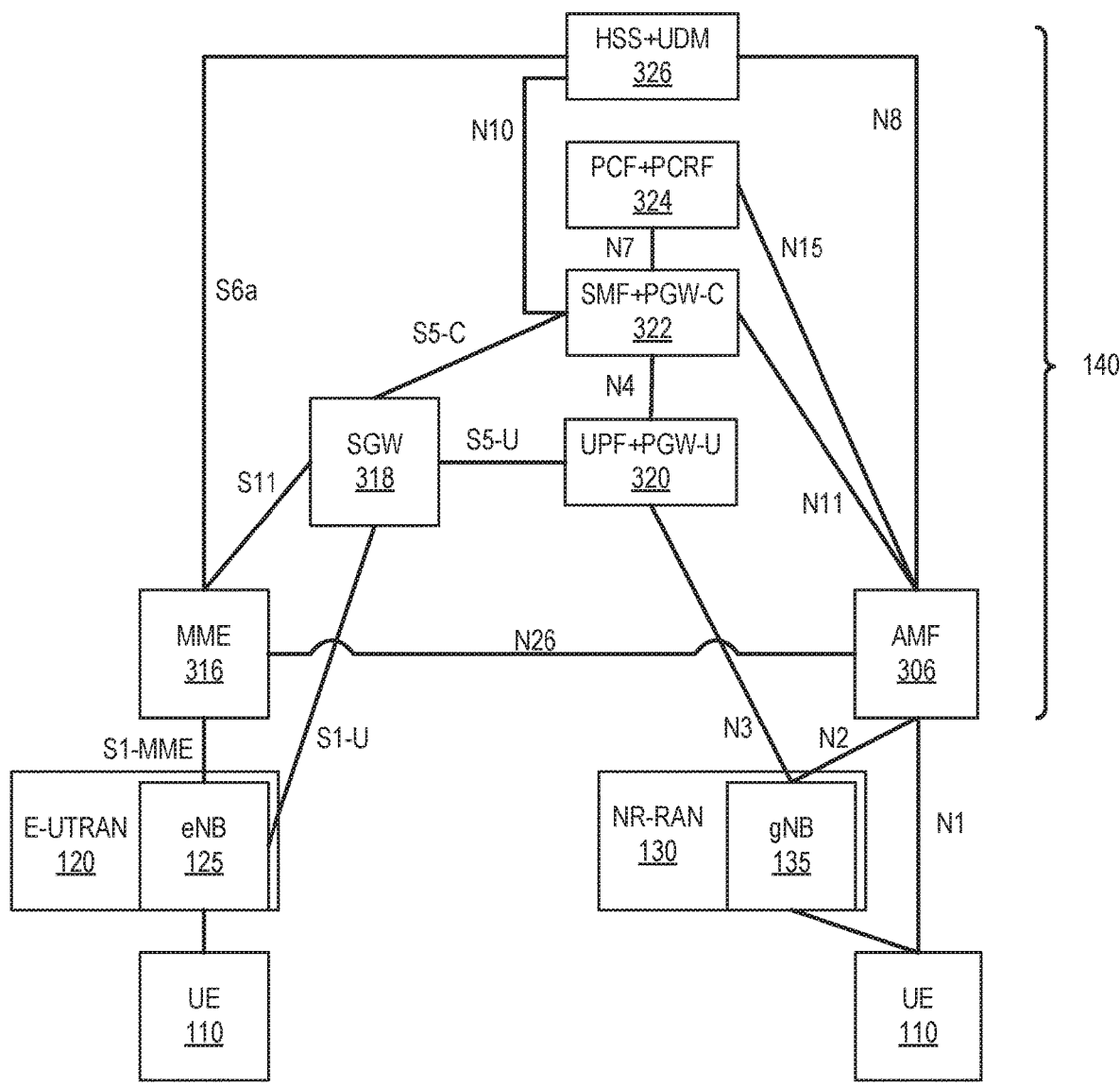
FIG. 3 illustrates functional components and connections of networks of FIG. 1

FIG. 3 illustrates functional components in a portion 300 of network environment 100 according to an exemplary implementation. In this implementation, core network 140 includes an interworking 5G and LTE core network and may share common network elements (e.g., corresponding to one or more network devices 145). For example, core network includes a combined User Plane Function (UPF) and PDN Gateway-User Plane function (PGW-U) 320. UPF and PGW-U 320 may occupy the same physical device or a software module. UE 110 may access core network 140 via E-UTRAN 120/eNB 125 and NR-RAN 130/gNB 135.

As shown, core network 140 includes Access and Mobility Function (AMF) 306, Mobility Management Entity (MME) 316, Serving Gateway (SGW) 318, UPF+PGW-U 320, a combined session management function and PDN gateway-control plane function (SMF+PGW-C) 322, a combined policy charging function and Policy and Charging Rules Function (PCF+PCRF) 324, and a combined unified data management function and home subscriber server (UDM+HSS) 326. Although core network 140 may have additional network nodes and/or functions that interact with one another via different interfaces, they are not illustrated in FIG. 3 for simplicity.

gNB 135 may provide wireless devices, such as UE device 110, access to core network 140. As discussed above, gNB 135 is part of an RAN 130, which may include additional wireless stations.

AMF 306 may perform registration management, connection management, reachability management, mobility management, lawful intercepts, access authentication and authorization, positioning services management, management of non-3GPP access networks, and/or other types of management processes. gNB 135 may interact with AMF 306 via an N2 interface. UE 110 may interact with AMF 306 via an N1 interface.

eNB 125 may provide access to network 312, to wireless devices, such as UE device 110. As discussed above, eNB 125 is part of RAN 120, which may include additional wireless stations.

MME 316 may provide control plane processing for an evolved packet core (EPC) in network 312. For example, MME 316 may implement tracking and paging procedures for UE device 110, may activate and deactivate bearers for UE device 110, may authenticate a user of UE device 110 and may interface to non-LTE radio access networks. A bearer may represent a logical channel with particular QoS requirements. MME 316 may also select a particular SGW for a particular UE device 110. MME 316 may communicate with eNB 125 through an S1-MME interface.

SGW 318 may provide an access point to UE device 110, handle forwarding of data packets for UE device 110, perform transport level markings (e.g., QoS Class Identifier (QCI)), and act as a local anchor point during handover procedures between wireless stations. In addition, SGW 318 may forward messages between MME 316 and UPF+PGW-U 320. For example, when SGW 318 receives a message from MME 316 indicating that UE device 110 is unavailable to accommodate a request to change the bearer, SGW 318 may forward the message to UPF+PGW-U 320. SGW 318 may interact with eNB 125, MME 316, and PGW 320 over an S1-U interface, an S11 interface, and S5-U interface, respectively.

UPF+PGW-U 320 may include a network device (e.g., a converged node) that provides UPF functionality for 5G and user plane functionality for 4G. SMF+PGW-C 322 may maintain an anchor point for intra/inter-RAT mobility, maintain an external Packet Data Unit (PDU) point of interconnection to a data network (e.g., DN/PDN 160), perform packet routing and forwarding, perform the user plane part of policy rule enforcement, perform packet inspection, perform lawful intercept, perform traffic usage reporting, enforce QoS policies in the user plane, perform uplink traffic verification, perform transport level packet marking, perform downlink packet buffering, send and forward an "end marker" to a RAN node (e.g., eNodeB 125), and/or perform other types of user plane processes. UPF+PGW-U 320 may communicate with SMF+PGW-C 322 using an N4 interface and connect to DN/PDN 160 using an N6 interface (not shown).

PCF+PCRF 324 may support policies to control network behavior, provide policy rules to control plane functions (e.g., to SMF+PGW-C 322), access subscription information relevant to policy decisions, make policy decisions, and/or perform other types of processes associated with policy enforcement. PCF+PCRF 324 may specify QoS policies based on QoS flow identity (QFI) consistent with, for example, 5G network standards.

HSS+UDM 326 may store subscription information associated with UE devices 110 and/or information associated with users of UE devices 110. For example, HSS+UDM 326 may store subscription profiles that include authentication, access, and/or authorization information. Each subscription profile may include information identifying UE device 110, authentication and/or authorization information for UE device 110, services enabled and/or authorized for UE device 110, device group membership information for UE device 110, and/or other types of information associated with UE device 110.

In FIG. 3, when UE device 110 is handed off from eNB 125 to gNB 135, for example, MME 316 communicates with AMF 306 to provide AMF 306 with information about UE device 110 (e.g., bearer information) over an N26 interface. The inter-system communication between MME 316 and AMF 306 prevents core network 140 from having to change bearers or having to go through the process of recycling network resources already allocated for UE device 110.

Figure 4:
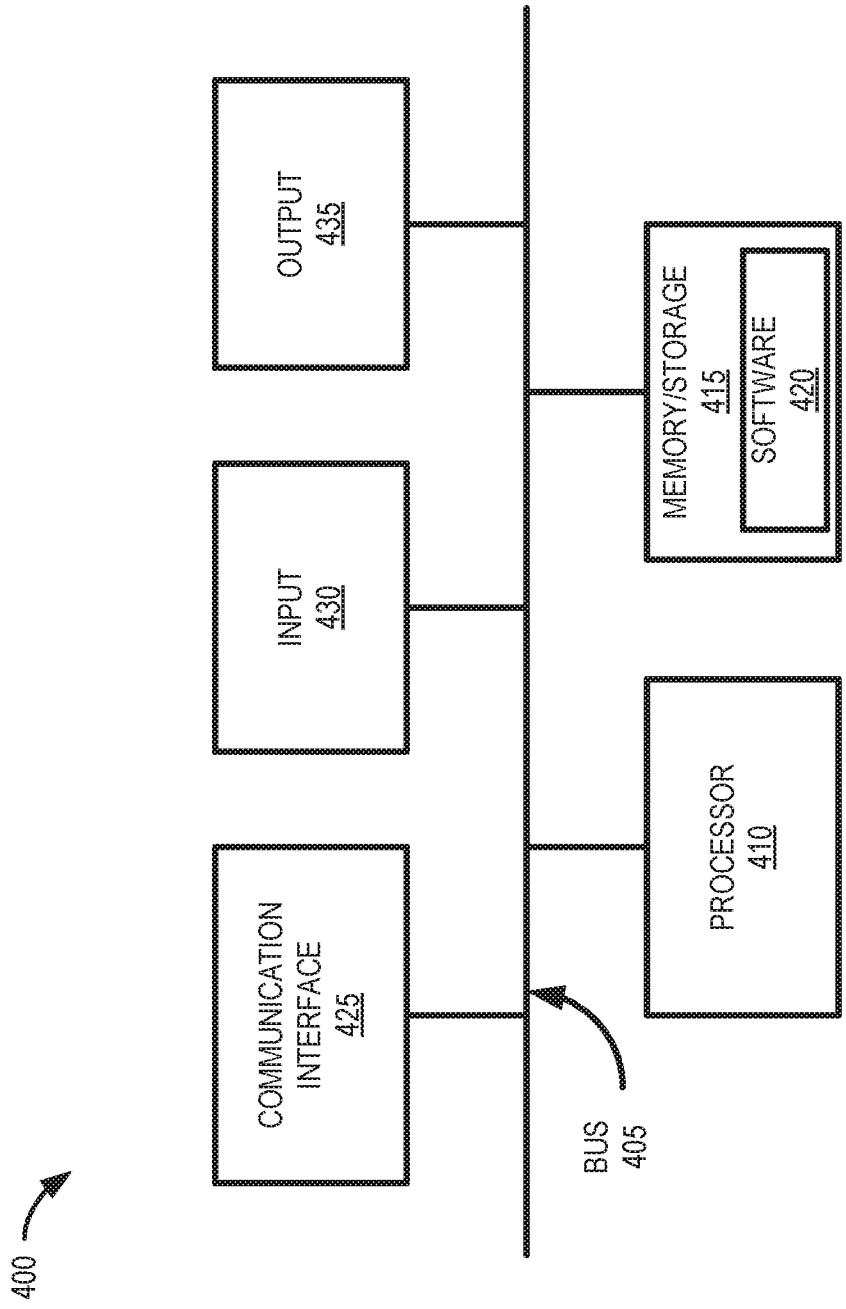
FIG. 4 is a diagram of exemplary components that may be included in one or more of the devices shown in FIGS. 1-3.

FIG. 4 is a diagram illustrating exemplary components of a device 400 that may correspond to one or more of the devices described herein. For example, device 400 may correspond to components included in UE device 110, eNB 125, gNB 135, and network devices 145 (such as AMF 306, MME 316, SGW 318, and UPF+PGW-U 320). As illustrated in FIG. 4, according to an exemplary embodiment, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, and/or clocks.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc. Processor 410 may be a dedicated component or a non-dedicated component (e.g., a shared resource).

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include a drive for reading from and writing to the storage medium.

Memory/storage 415 may be external to and/or removable from device 400, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. Software 420 may include an operating system. Software 420 is also intended to include firmware, middleware, microcode, hardware description language (HDL), and/or other forms of instruction. Additionally, for example, UE device 110 may include logic to perform tasks, as described herein, based on software 420.

Communication interface 425 permits device 400 to communicate with other devices, networks, systems, devices, and/or the like. Communication interface 425 includes one or multiple wireless interfaces and/or wired interfaces. For example, communication interface 425 may include one or multiple transmitters and receivers, or transceivers. Communication interface 425 may include one or more antennas. For example, communication interface 425 may include an array of antennas. Communication interface 425 may operate according to a protocol stack and a communication standard. Communication interface 425 may include various processing logic or circuitry (e.g., multiplexing/de-multiplexing, filtering, amplifying, converting, error correction, etc.).

Input 430 permits an input into device 400. For example, input 430 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 435 permits an output from device 400. For example, output 435 may include a speaker, a display, a light, an output port, and/or some other type of visual, auditory, tactile, etc., output component. According to some embodiments, input 430 and/or output 435 may be a device that is attachable to and removable from device 400.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

FIGS. 5-8 are signal flow diagrams illustrating exemplary communications in a portion 500 of network environment 100 for triggering a return to a 5G connection after concluding a call with VoLTE fallback. As shown in FIGS. 5-8, network portion 500 may include UE device 110, eNB 125, MME 316, AMF 306, gNB 135, and IMS network 150. Each of FIGS. 5-8 relates to different embodiments where eNB 215 triggers a handover procedure from eNB 125 (e.g., RAN 120) to gNB 135 (e.g., RAN 130) at the completion of a VoLTE call from a 5G-capable UE device 110. Assume, in each of FIGS. 5-8, that UE device 110 is 5G-capable (e.g., NR standalone-capable) in a coverage area that does not support VoNR, such as described above in connection with FIG. 2. Further assume that when a voice call starts, UE device 110 is redirected or performs an inter-RAT handover from gNB 135 (e.g., RAN 130) to eNB 125 (e.g., RAN 120) when the dedicated bearer required for the voice call is set up.

Figure 5:
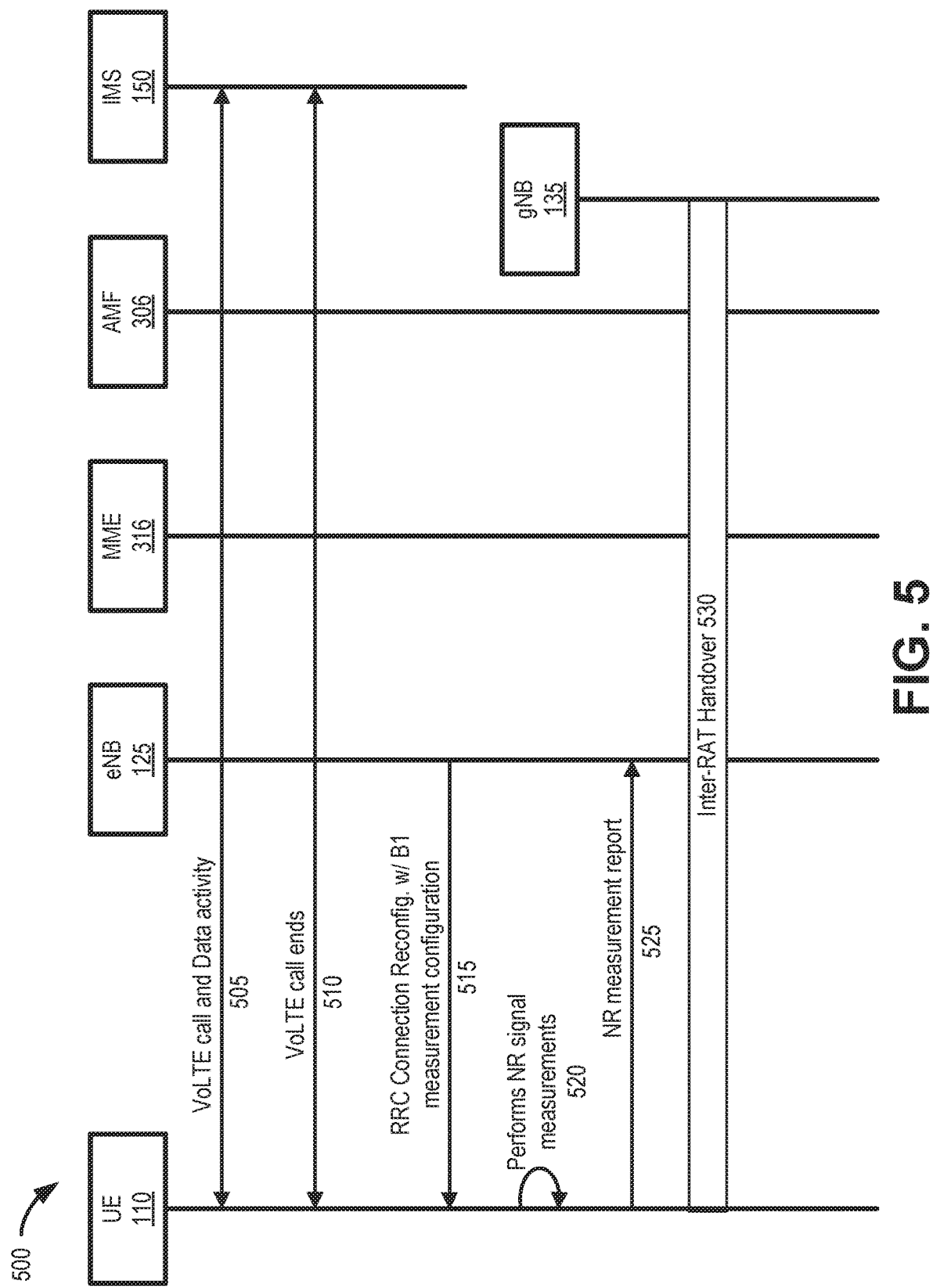
FIGS. 5-8 are signal flow diagrams illustrating exemplary communications for triggering a return to a 5G connection after concluding a call with voice-over-LTE (VoLTE) fallback, according to implementations described herein.

Referring to FIG. 5, communications to trigger a fast return to 5G service may be included in an RRC Connection Reconfiguration message. As shown at reference 505, UE device 110 may simultaneously conduct a VoLTE call and separate data activity (e.g., a game, a video stream, live scores, etc.). eNB 125 may detect the end of the VoLTE call, as indicated at reference 510. As soon as the VoLTE call is over, eNB 125 may send a RRC Connection Reconfiguration message to release the VoLTE bearer (e.g., a QCI-1 bearer) including some parameter reconfiguration (e.g., a connected mode discontinuous reception (cDRX) setting) in accordance with conventional protocols. According to an implementation, however, and as shown at reference 515, eNB 125 may use the same RRC Connection Reconfiguration message to trigger a handover to 5G by configuring a B1 measurement (e.g., for LTE event B1, per 3GPP TS 36.331) on designated neighboring NR bands (e.g., to detect if a neighbor cell is better than an absolute threshold). This modified RRC Connection Reconfiguration message will trigger a measurement report of the NR bands from UE device 110 if the UE is still in a NR coverage area (e.g., coverage area 220). Thus, UE device 110 may perform signal measurements 520 and provide a NR measurement report 525 to eNB 125. Once the NR measurement reports is received, eNB 125 may initiate an inter-RAT handover 530 back to 5G service (e.g., via gNB 135) immediately. For example, eNB 125 may signal MME 316, which may utilize an N26 interface with AMF 306 to transfer information for UE 110.

Figure 6:
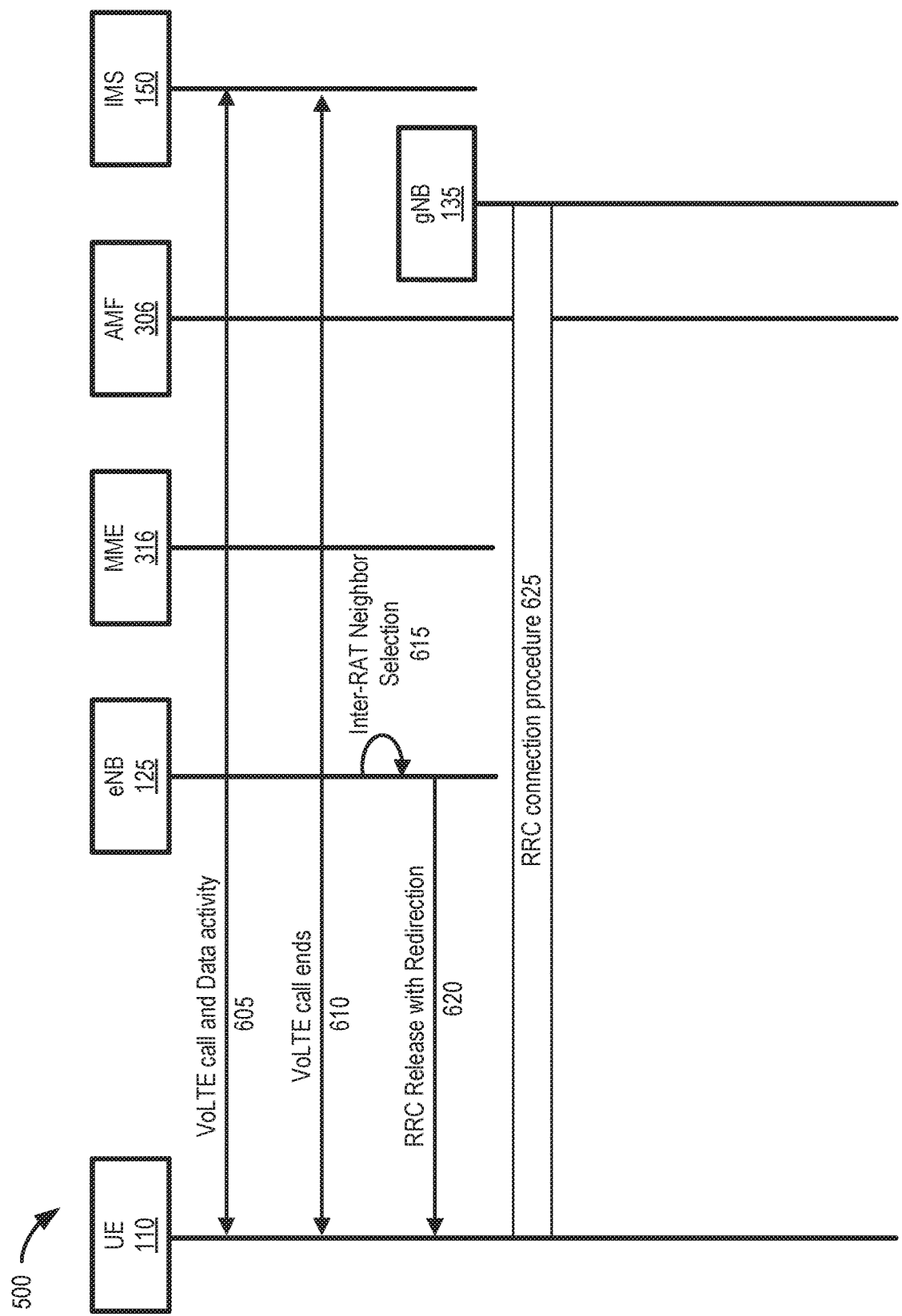

According to FIG. 6, communications to trigger a fast return to 5G service are initiated through a blind redirection at the end of a VoLTE call. Similar to FIG. 5, UE device 110 may simultaneously conduct a VoLTE call and separate data activity, as shown in reference 605, and eNB 125 may detect the end of the VoLTE call, as indicated at reference 610. As soon as the VoLTE call is over, eNB 125 may perform a blind redirection for UE device 110. More particularly, eNB 125 may send a RRC release message w/redirection to another RAT (e.g., gNB 135 for RAN 130) based on an Inter-RAT neighbor list configuration stored by eNB 125. For example, eNB 125 may transmit a RRC Connection Release message 620 to UE device 110. Thereafter, UE device 110 may re-establish a RRC connection via the 5G NR RAN (e.g., gNB 135), as indicated by reference 625.

In contrast with the modified RRC Connection Reconfiguration message described in connection with FIG. 5, the blind redirection process of FIG. 6 may be faster, since UE device 110 does not need to measure NR bands and can immediately search for NR bands for a reattachment. Furthermore, the blind redirection of FIG. 6 may be used in RANs that do not support the N26 interface. If UE device 110 moves out of a NR coverage area during the VoLTE call, UE device 110 will fail to find NR bands and come back to search LTE bands and continue data service using RAN 120/eNB 125.

Figure 7:
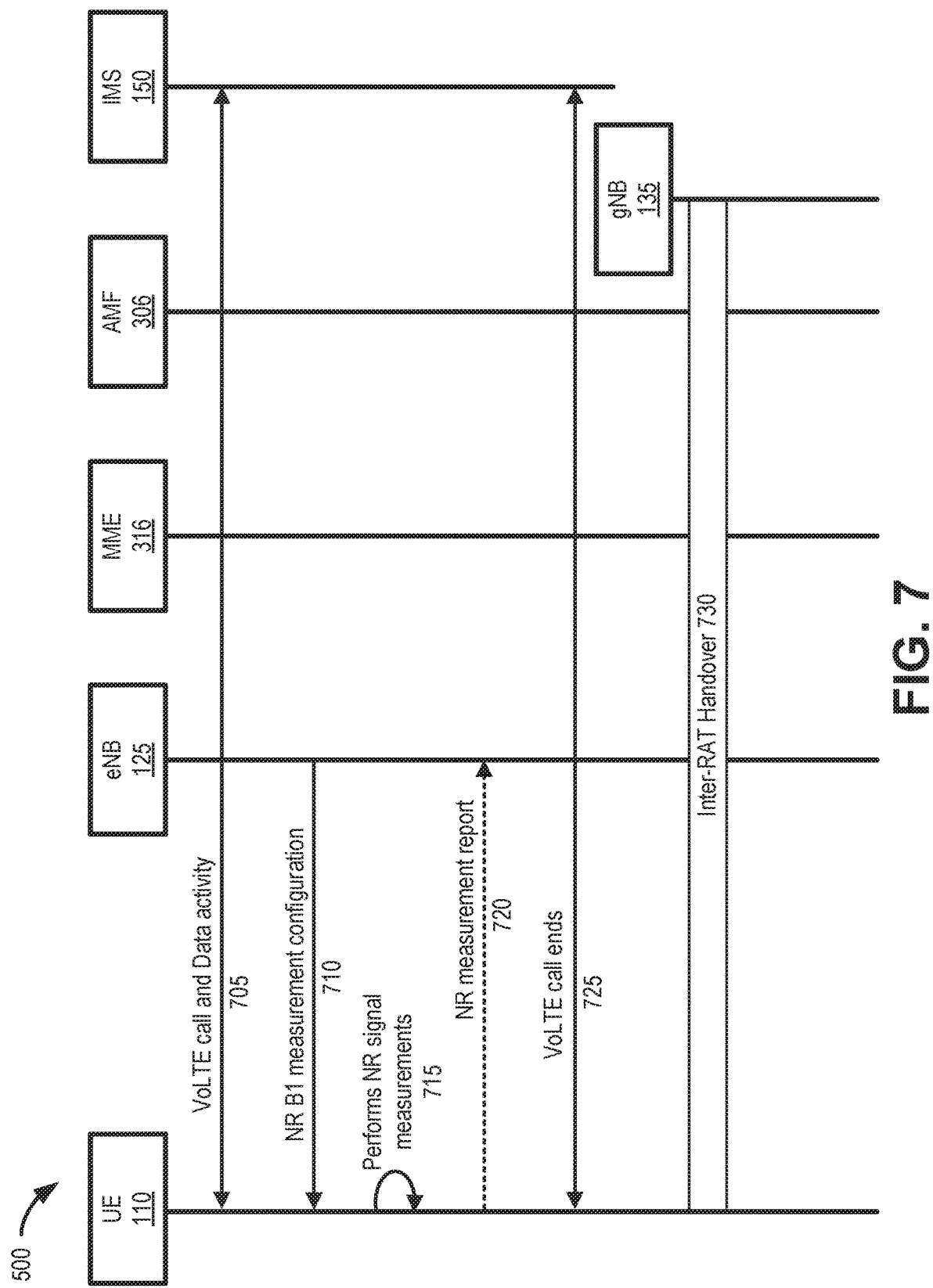

Referring to FIG. 7, eNB 125 may configure B1 event measurements at the start of a VoLTE call to reduce measurement latency that may occur through the modified RRC Connection Reconfiguration message described in connection with FIG. 5. Similar to FIG. 5, UE device 110 may simultaneously conduct a VoLTE call and separate data activity, as shown in reference 705. Based on the VoLTE call connection (e.g., as soon as the VoLTE call is started), eNB 125 may configure NR B1 measurement on NR bands, as indicated by reference 710. For example, eNB 125 may send a RRC Connection Reconfiguration message with the measurement configuration. The NR B1 measurement configuration may cause UE 110 to perform NR signal measurements, as shown in reference 715, and trigger a measurement report 720 from UE device 110 if certain conditions are met.

In the measurement configuration 710, eNB 125 can configure reporting configurations in the RRC Connection Reconfiguration message to "report on leave," so that UE device 110 will send the measurement report 720 if the radio frequency (RF) condition for entering the condition no longer exists. In this way, eNB 125 is "stateful" when it comes to the UE device 110 measurement report 720. When VoLTE call ends 725, eNB 125 can use the measurement report (or lack thereof) to determine whether to trigger a 4G-to-5G inter-RAT handover 730. For example, if measurement report 720 indicates that UE device 110 is still in NR coverage, of if no measurement report 720 is received (e.g., indicating UE device 110 did not leave NR coverage), eNB 125 may initiate a 4G-to-5G inter-RAT handover.

Given the NR B1 measurement configuration at the start of a VoLTE call, it is probable that UE device 110 will report NR band measurement during the VoLTE call. Upon the end of VoLTE call, if no additional measurement report is received from the UE device 110 regarding NR bands measurement, eNB 125 may conclude that condition has not changed. eNB 125 may, therefore, use the "last" measurement report to perform a 4G to 5G handover. Otherwise, UE device 110 will not report B1 measurement as long as the RF criteria are met. Once a measurement report is received, eNB 125 can evaluate if the NR bands still meet the condition for a handover to 5G. Because the measurement configuration to "report on leave" would result in UE device 110 sending a report only when the RF condition for the NR bands is not acceptable (e.g., out of the coverage area 220 of gNB 135), eNB 125 would determine the NR bands do not meet the condition for a handover.

Figure 8:
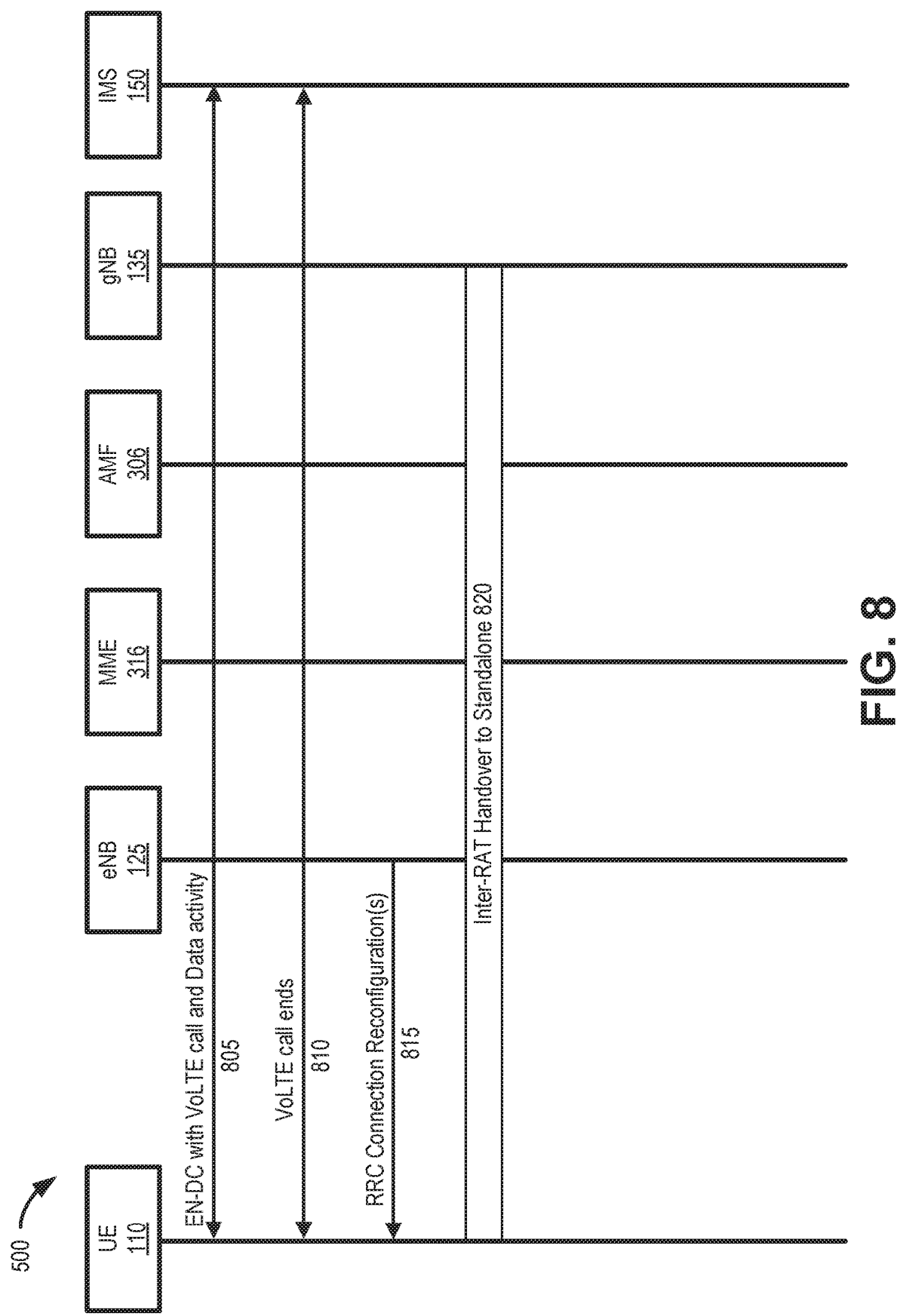

Referring to FIG. 8, communications to trigger a fast return to 5G service may also be applied during a EN-DC connection, such an EN-DC connection where eNB 125 serves as an anchor for a 5G NR connection via gNB 135. In the example of FIG. 8, UE device 110 may simultaneously conduct a VoLTE call and separate data activity over an EN-DC connection that uses both LTE and NR connections for a data session, as shown in reference 805. eNB 125 may detect the end of the VoLTE call, as indicated at reference 810. If UE device 110 is configured with an EN-DC connection while a VoLTE call is released, eNB 125 may send an RRC Connection Reconfiguration message 815 to release the VoLTE bearer (e.g., a QCI-1 bearer) and at the same time may trigger an immediate Inter-RAT handover to the NR leg of the previous EN-DC connection (e.g., without any B1 measurement). As indicated by reference 820, eNB 125 and gNB 135 may participate in an Inter-RAT handover to switch UE device 110 over to 5G NR standalone operation with gNB 135.

The post VoLTE communications in FIG. 8 can maintain service continuity, since eNB 125, as the LTE anchor for the EN-DC connection, is still accessible from coverage area 210 (FIG. 2) even if UE device 110 is not in NR coverage (e.g., within coverage area 220). Once the NR leg for the EN-DC connection is successfully added in a non-standalone mode (e.g., UE device 110 is indeed in a NR coverage area), then eNB 125 can take the action of inter-RAT handover to standalone mode, as indicated by reference 830. The communications of FIG. 8 are exemplary. In other implementations, eNB 125 can send the first RRC Connection Reconfiguration message 815 to release the QCI-1 bearer, and subsequently send a second RRC Connection Reconfiguration message (not shown) to trigger the handover to 5G service. Above solution can be used on a NR carrier that supports both non-standalone and standalone operations.

Figure 9:
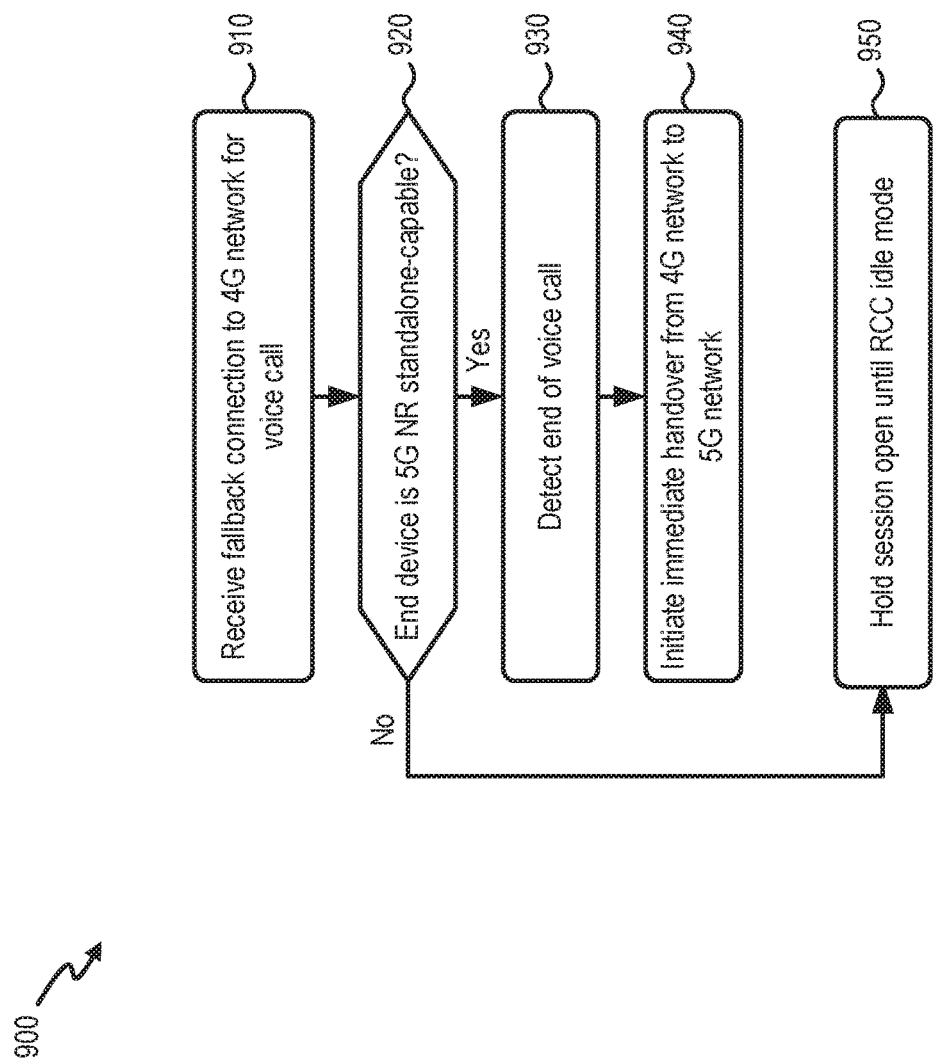
FIG. 9 is a flow diagram illustrating an exemplary process for bringing a 5G standalone-capable end device back into 5G service as soon as a VoLTE call is over, according to an implementation described herein.

FIG. 9 is a flow diagram illustrating an exemplary process 900 to bring a 5G standalone-capable end device back into 5G service as soon as a VoLTE call is over, according to an implementation described herein. In one implementation, process 900 may be implemented by eNB 125. In another implementation, process 900 may be implemented by an eNB 125 in conjunction with one or more other devices in network environment 100.

Referring to FIG. 9, process 900 may include receiving a fallback connection to a 4G network for a voice call (block 910) and determining if the end device is 5G NR standalone capable (block 920). For example, eNB 125 (or another wireless station) may receive a handover for a fallback connection from gNB 135 (e.g., RAN 130) to support a VoLTE call on UE device 110. eNB 125 may receive information from UE device 110 and or other network devices indicating that UE device 110 is 5G NR standalone-capable.

If the end device is 5G NR standalone capable (block 920—Yes), process 900 may further include detecting an end of the voice call (block 930) and initiating an immediate handover from the 4G network to the 5G network (block 940). For example, eNB 125 may detect an end of the VoLTE call, and initiate, in response to the detecting, a handover of the UE device 110 back to the RAN 130/gNB 135. According to implementations described herein, eNB 125 may initiate the handover while UE device 110 is still in a radio resource control (RRC) connected mode.

If the end device is not 5G NR standalone capable (block 920—No), process 900 may hold the existing session open until an RCC idle mode occurs (block 950). For example, if UE device 110 is not 5G NR standalone-capable, eNB 110 may follow conventional procedures to wait for UE device 110 to perform higher priority system selection when UE device 110 transitions to an RRC idle mode.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 7, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method, comprising:
   receiving, by a wireless station, a fallback connection, for a Fifth Generation (5G) New Radio (NR) standalone-capable end device, from a second network to a first network to support a voice call on the end device, wherein the fallback connection supports a voice-over-Long Term Evolution (VoLTE) call;
   detecting, by the wireless station, an end of the VoLTE call; and
   initiating, by the wireless station and based on the detecting, a handover of the end device back to the second network, wherein the initiating occurs while the end device is in a radio resource control (RRC) connected mode, and wherein the initiating includes:
   identifying whether the end device has dual connectivity capability,
   sending, after the detecting and based on the identifying, instructions to initiate a non-standalone connection with the second network via the wireless station when the end device has the dual connectivity capability, and
   sending, to the end device and within an RRC Connection Reconfiguration message, radio measurement configurations for NR frequency bands when the end device does not have the dual connectivity capability.

2. The method of claim 1, wherein wireless station includes an evolved Node B for an Evolved Universal Mobile Telecommunications System (UMTS) Terrestrial Radio Access Network (E-UTRAN),
   wherein the first network includes the E-UTRAN for an LTE network, and
   wherein the second network device includes a 5G network.

3. The method of claim 1, further comprising:
   sending, in response to the receiving, a B1 measurement configuration to the end device during the VoLTE call.

4. The method of claim 3, wherein the B1 measurement configuration instructs the end device to provide a measurement report when the end device detects leaving a coverage area of the second network.

5. The method of claim 4, wherein the initiating further comprises:
directing, based on a failure to receive the measurement report, the handover of the end device back to the second network.

6. The method of claim 1, wherein the initiating includes:
sending, to the end device and without relying on a signal measurement from the end device, a RRC Release message with redirection instructions to the second network.

7. A network device comprising:
an interface to wirelessly communicate with end devices via a first network; and
a processor configured to:
receive a fallback connection, for a Fifth Generation (5G) New Radio (NR) standalone-capable end device, from a second network to the first network to support a voice call on the end device, wherein the fallback connection supports a voice-over-Long Term Evolution (VoLTE) call,
detect an end of the VoLTE call, and
initiate, based on the detecting, a handover of the end device back to the second network, wherein the initiating occurs while the end device is in a radio resource control (RRC) connected mode, and wherein the initiating includes:
identifying whether the end device has dual connectivity capability,
sending, after the detecting and based on the identifying, instructions to initiate a non-standalone connection with the second network via the network device when the end device has the dual connectivity capability, and
sending, to the end device and within an RRC Connection Reconfiguration message, radio measurement configurations for NR frequency bands when the end device does not have the dual connectivity capability.

8. The network device of claim 7, wherein the network device includes an evolved Node B for an E-UTRAN.

9. The network device of claim 7, wherein, when the processor detects the end of the VoLTE call, the processor is further configured to:
detect a data session on the first network that continues after the end of the VoLTE call.

10. The network device of claim 7, wherein the first network includes a LTE network, and wherein the second network device includes a 5G network.

11. The network device of claim 7, wherein the processor is further configured to:
send, in response to receiving the fallback connection, a B1 measurement configuration to the end device during the VoLTE call, wherein the B1 measurement configuration instructs the end device to provide a measurement report when the end device detects leaving a coverage area of the second network.

12. The network device of claim 7, wherein, the processor is further configured to:
send, to the end device, a release message for the first network with redirection instructions to the second network.

13. The network device of claim 7, wherein, when identifying whether the end device has dual connectivity capability, the processor is further configured to:
identify an Evolved Universal Mobile Telecommunications System (UMTS) Terrestrial Radio Access Network (E-UTRAN)-NR Dual Connectivity (EN-DC) capability of the end device.

14. A non-transitory computer-readable medium containing instructions executable by at least one processor, the non-transitory computer-readable medium comprising one or more instructions to cause the at least one processor to:
receive, by a wireless station for a first network, a fallback connection, for a Fifth Generation (5G) New Radio (NR) standalone-capable end device, from a second network to the first network to support a voice call on the end device, wherein the fallback connection supports a voice-over-Long Term Evolution (VoLTE) call;
detect, by the wireless station, an end of the VoLTE call; and
initiate, by the wireless station and based on the detecting, a handover of the end device back to the second network, wherein the initiating occurs while the end device is in a radio resource control (RRC) connected mode, and wherein the instructions to initiate the handover further include instructions to:
identify whether the end device has dual connectivity capability;
send, after the detecting and based on the identifying, instructions to initiate a non-standalone connection with the second network via the wireless station when the end device has the dual connectivity capability; and
send, to the end device and within an RRC Connection Reconfiguration message, radio measurement configurations for NR frequency bands when the end device does not have the dual connectivity capability.

15. The non-transitory computer-readable medium of claim 14, further comprising instructions to cause the at least one processor to:
send, to the end device, a RRC Release message with redirection instructions to the second network and without relying on a signal measurement from the end device.

16. The network device of claim 7, wherein the processor is further configured to:
store an inter-radio access technology (RAT) neighbor list, and
wherein the initiating further comprises providing direction to another wireless station based on the inter-RAT neighbor list.

17. The network device of claim 7, wherein the processor is further configured to:
send, to the end device, a RRC Release message with redirection instructions to the second network, wherein sending the RRC Release message is triggered without relying on a signal measurement from the end device.

18. The network device of claim 7, wherein the processor is further configured to:
send, in response to receiving the fallback connection, a B1 measurement configuration to the end device during the VoLTE call.

19. The method of claim 1, wherein identifying whether the end device has dual connectivity capability includes identifying whether the end device has an E-UTRAN-NR Dual Connectivity (EN-DC) capability.

20. The non-transitory computer-readable medium of claim 14, wherein the dual connectivity capability includes an E-UTRAN-NR Dual Connectivity (EN-DC) capability.

* * * * *